Nov. 18, 1969  A. H. LAMB  3,478,592
DIVERS THERMOMETER
Filed Oct. 19, 1967
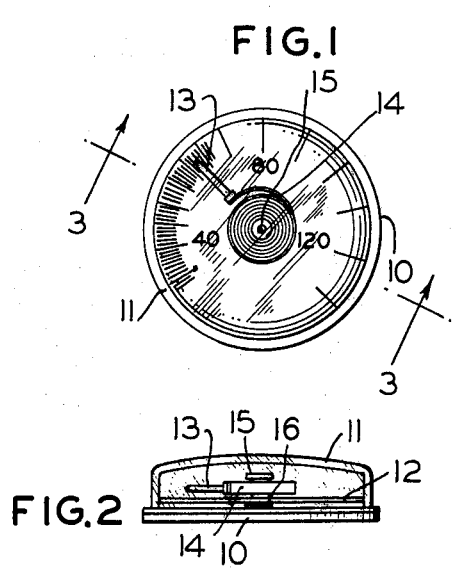
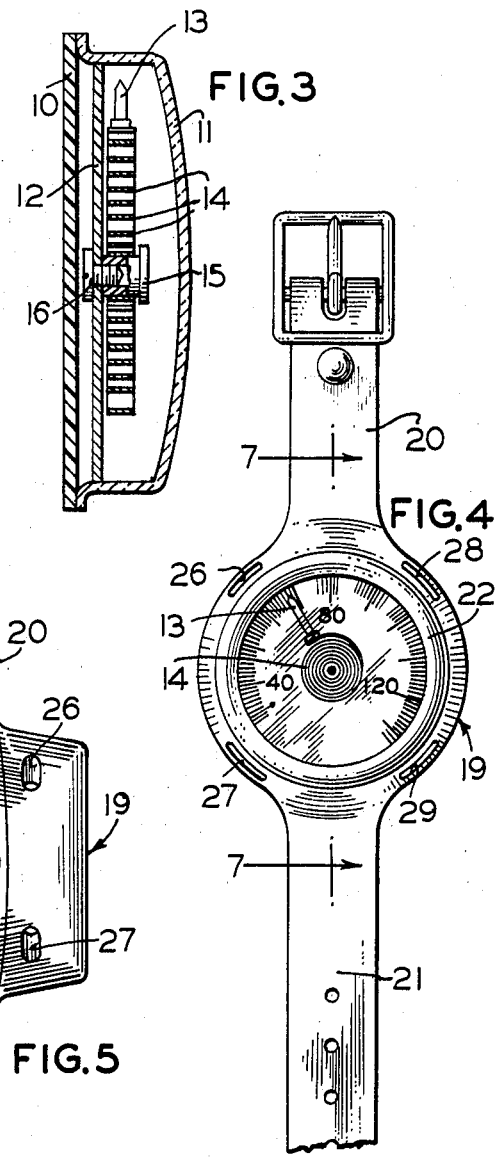
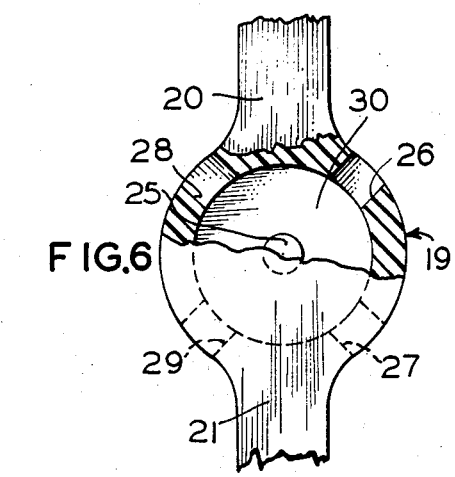
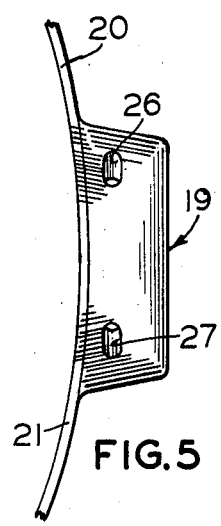
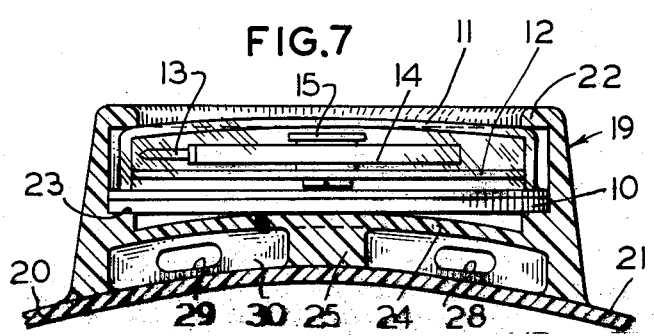
INVENTOR
ANTHONY H. LAMB
BY Rudolph Gurick
ATTORNEY

United States Patent Office 3,478,592
Patented Nov. 18, 1969

3,478,592
DIVERS THERMOMETER
Anthony H. Lamb, 66 King St., Hillside, N.J. 07205
Filed Oct. 19, 1967, Ser. No. 676,411
Int. Cl. G01k 5/64
U.S. Cl. 73—363.9
6 Claims

ABSTRACT OF THE DISCLOSURE

A bi-metallic thermometer worn like a wrist watch by scuba and skin divers. A plastic housing encloses a spiral bi-metallic coil having secured thereto a pointer movable over a calibrated scale of temperature values. The housing is press-fitted into a cylindrical barrel of a wrist strap, which barrel is provided with passageways for the flow of water therethrough.

BACKGROUND OF THE INVENTION

It is important for a scuba or skin diver to know the temperature of the water in the particular area in which he is operating. This temperature effects not only the length of time in which he can safely remain submerged, but also his metabolism and dexterity. Furthermore, it is often desirable to make a record of the water temperature and pressure to establish the conditions under which a specific operation has been performed, to plot the course of natural water currents, etc. It would be convenient to record the water temperature on photographic film simultaneously when taking an underwater photograph. Rugged, shockproof, easy to read and to photograph thermometers for underwater use heretofore have not been available.

SUMMARY TO THE INVENTION

A thermometer made in accordance with this invention comprises a housing having a clear plastic cover. Disposed within the housing is a scale plate having heat-reflecting surfaces, the upper such surface having printed thereon a scale calibrated in temperature values. A spiral, bi-metallic coil is supported by the scale plate and carries a pointer movable over the scale, said coil being positioned close to the cover to provide a rapid response. The thermometer is designed to be press fitted into the cylindrical barrel of a wrist strap, said barrel being provided with passageways for the flow of water between the thermometer and the wrist of the wearer. This arrangement, together with the heat reflecting lower surface of the scale plate, effectively isolates the bi-metallic sensing coil from body heat.

An object of this invention is the provision of a thermometer particularly adapted for underwater use by divers.

An object of this invention is the provision of a bi-metallic thermometer to be worn like a wrist watch, said thermometer being designed and constructed for rapid response to temperature changes, effectively shielded from body temperature when attached to the wrist during use, and having a scale which is easy to read.

An object of this invention is the provision of a divers thermometer comprising a bi-metallic coil, pointer and scale plate disposed within a housing having a cup-like, clear plastic cover, and a flexible plastic wrist band having a cylindrical barrel into which the said housing is press-fitted, said barrel being provided with passageways for the flow of water therethrough.

The above-stated and other objects and advantages of the invention will become apparent from the following description when taken with the accompanying drawings. It will be understood, however, that the drawings are for purposes of illustration and are not to be construed as defining the scope or limits of the invention, reference being had for the latter purpose to the claims appended hereto.

BRIEF DESCRIPTION OF THE DRAWINGS

In the drawings wherein like reference characters denote like parts in the several views;

FIGURE 1 is a top plan view of a thermometer made in accordance with this invention;

FIGURE 2 is a side elevational view thereof;

FIGURE 3 is an enlarged cross-sectional view taken along the line 3—3 of FIGURE 1;

FIGURE 4 is a top plan view showing the thermometer carried by a wrist band;

FIGURE 5 is a fragmentary side elevational view;

FIGURE 6 is a fragmentary bottom plan view thereof; and

FIGURE 7 is an enlarged cross-sectional view taken along the line 7—7 of FIGURE 4.

Referring to FIGURES 1–3, the housing of the thermometer comprises a flat plastic base 10 having a cup-shaped, clear plastic cover 11 secured thereto. Disposed within the housing is a metal plate 12 preferably made of aluminum and having a heat and light reflecting coating, such as, for example, white enamel formed on the front surface thereof, which coating has printed thereon, preferably in black, a scale calibrated in temperature values. The other, or rear, surface of this plate is highly polished for purposes which will be described hereinbelow. Movable over the scale is a pointer 13 which is secured to the outer end of a spiral, bi-metallic coil 14, said coil having its inner end secured to a stud 15. The angular orientation of the coil is preset at the factory to align the pointer with the scale mark corresponding to the temperature of the room, after which the screw 16 is threaded firmly into the stud. This secures the inner end of the coil in a fixed position relative to the scale, thereby maintaining integrity of the thermometer indications. After the scale plate has been press-fitted into the cover 11, the outwardly-directed flange of the cover is fused to the base 10, thereby to form a water-tight housing. The housing may be filled with a dry gas or a clear oil.

A flexible band is provided so that the thermometer can be worn like a wrist watch. Referring to FIGURES 4–7, the band, made of a pliable plastic, comprises a cylindrical barrel 19 and integral straps 20 and 21, said barrel including an inwardly-directed lip 22. The bottom surface of the barrel is concave conforming to the contour of the wrist. An internal ledge 23, FIGURE 7, supports the thermometer which is press-fitted into the barrel in response to tension applied to the straps. rated from the lower portion of the barrel by an integral partition wall 24 having a central boss 25, see also FIGURE 6. This partition wall limits the deformation of the barrel in response to tension applied to the straps. Formed in the side wall of the barrel are openings 26–29, which openings communicate with the circular channel 30. When the thermometer is worn by a diver, water passes through the openings and the channel upon movement of the divers arm or by reason of the movement of natural water currents, whereby the thermometer is completely surrounded by water to maximize the response of the sensing coil.

A thermometer made as described above is of relatively small size, having a diameter of approximately 2 inches, an overall thickness of ⅜ inch and a scale length of 3 inches. The sensing coil is positioned close to the top of the cover which contacts the water and the white enamel surface of the scale plate reflects water heat rays back up to the sensing coil. On the other hand, the polished lower surface of the scale plate reflects heat rays away from the sensing coil, thereby eliminating the effect of body temperature on the reading. The housing is sealed against water entry and scale fogging and the large scale, formed of black lines and numerals on a white background, permits easy reading and photographing. Further, the plastic case will compress and expand slightly under changing external water pressures and in response to the expansion of the internal gas or oil. These features result in a rugged, shockproof, easy to read instrument especially adapted for use by serious military and sport divers.

The oil filled thermometer is particularly adapted for use in relatively deep water. In certain specific applications wherein it is desirable to measure temperature changes as quickly as possible, a plurality of holes are formed in the top and side wall of the plastic cover.

Having now described the invention, those skilled in this art will be able to make various changes and modifications without thereby departing from the scope and spirit of the invention.

I claim:
1. A thermometer comprising,
   (a) a cup-like, clear plastic cover having an outwardly-directed flange fuzed to a flat plastic plate to form a water-tight housing,
   (b) a flat scale plate disposed in the housing and having a heat reflecting surface,
   (c) a calibrated scale of temperature values on the other surface of the scale plate,
   (d) a spiral, bi-metallic coil having an inner and secured in relatively fixed position with respect to the scale plate,
   (e) a pointer secured to the outer end of said coil and movable over the said scale, and
   (f) a clear liquid filling the housing.

2. The invention as recited in claim 1, wherein the said scale is formed on a heat and light reflecting coating carried by the said other surface of the scale plate.

3. The invention as recited in claim 2, wherein the inner end of the coil is secured to a stud carried by the scale plate, said stud being manually rotatable about its axis to move the pointer relative to the said scale.

4. The invention as recited in claim 1, in combination with a flexible wrist strap having a cylindrical barrel, said housing being press-fitted into the said barrel.

5. The invention as recited in claim 4, wherein said barrel has an internal ledge supporting the said housing and an inwardly-directed, circular lip overlying a portion of the said cover.

6. The invention as recited in claim 1, including means forming passageways for the flow of liquid through the said barrel and below said circular lips.

References Cited
UNITED STATES PATENTS

| | | | |
|---|---|---|---|
| 2,701,964 | 2/1955 | Argabrite | 73—431 XR |
| 2,964,947 | 12/1960 | De Jong | 73—363.7 |
| 3,187,572 | 6/1965 | Harland | 73—345 |

LOUIS R. PRINCE, Primary Examiner

WILLIAM A. HENRY II, Assistant Examiner